March 8, 1966  P. H. WENDT  3,239,591
METHOD OF MAKING CLAY PIPE
Filed May 6, 1965  3 Sheets-Sheet 1
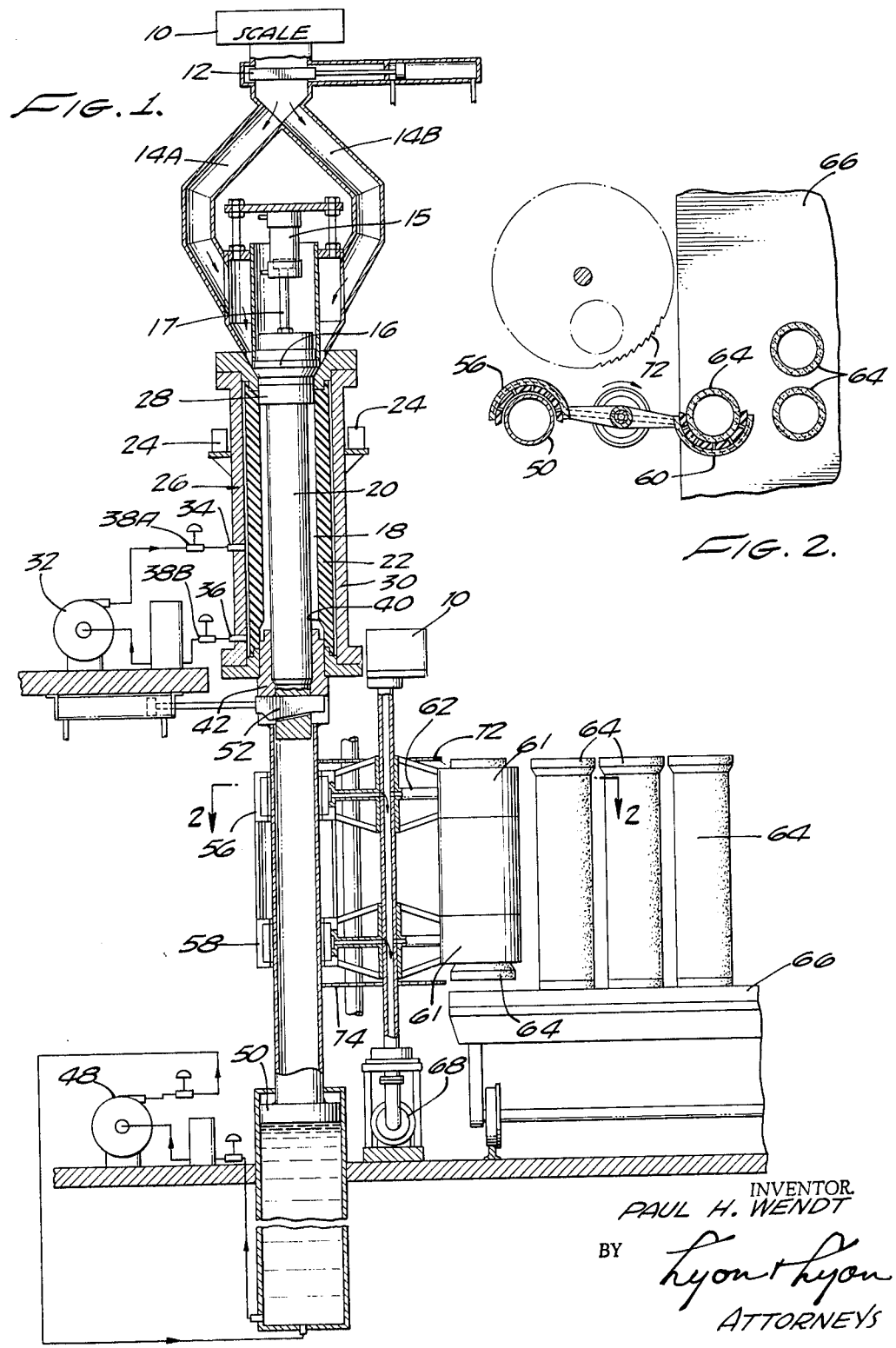
INVENTOR.
PAUL H. WENDT
BY Lyon & Lyon
ATTORNEYS

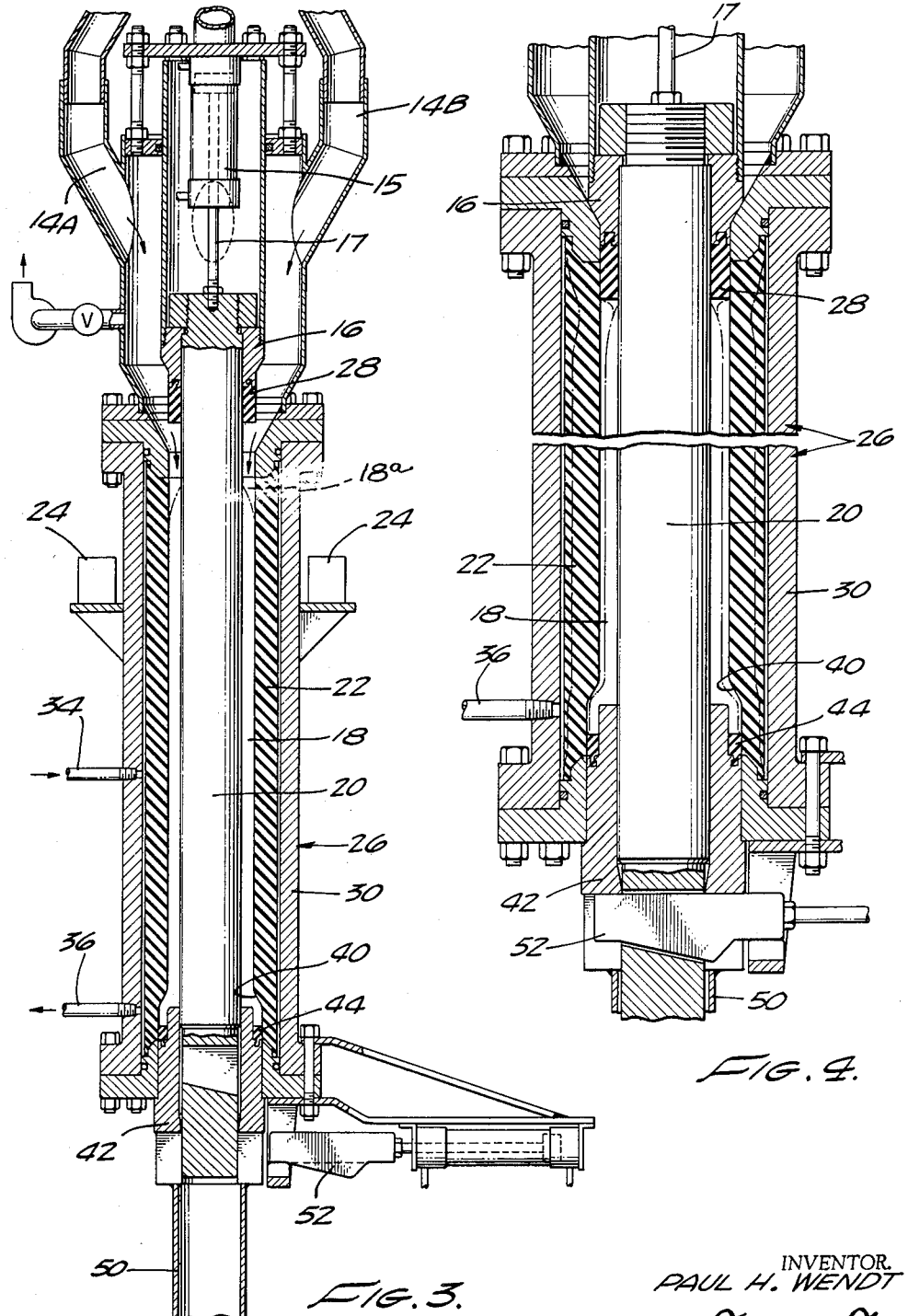

March 8, 1966 P. H. WENDT 3,239,591
METHOD OF MAKING CLAY PIPE
Filed May 6, 1965 3 Sheets-Sheet 3

INVENTOR.
PAUL H. WENDT
BY Lyon & Lyon
ATTORNEYS

United States Patent Office 3,239,591
Patented Mar. 8, 1966

3,239,591
METHOD OF MAKING CLAY PIPE
Paul H. Wendt, Arcadia, Calif., assignor to Pacific Clay Products, Los Angeles, Calif., a corporation of California
Filed May 6, 1965, Ser. No. 453,719
4 Claims. (Cl. 264—314)

This invention relates to an improved method of manufacturing clay pipe, and this application is a continuation-in-part of my copending application, Serial No. 202,480, filed June 14, 1962.

In the conventional extrusion method of manufacturing clay pipe, the clay is ground to a suitable particle size, and then water is added until the moisture content is approximately 20% by weight. Thereafter, the pipe must be dried in order to remove the excess water from the clay before the pipe can be fired for the purpose of vitrifying it, since otherwise the water would form steam and destroy the pipe. The normal drying process takes anywhere from twelve hours to four weeks.

Accordingly, it is an object of this invention to provide a new and novel method for manufacturing clay pipe in which the drying process is eliminated.

Another object of this invention is to provide a novel method of producing molded clay pipe having a sufficiently low water content to permit the pipe to be passed through the heating cycle for vitrifying without any intermediate drying step.

Other objects of this invention are to provide a novel method of dry-pressing clay pipe which has the following advantages:

(a) Superior quality pipe is produced which is free of the defects and shortcomings arising from the laminar pipe wall structure characteristic of pipe formed by the extrusion method.

(b) The cost of production is reduced because the dry-pressed clay pipe is sufficiently dry to permit immediate firing, without requiring days or weeks of drying time to reduce the moisture content to a level sufficiently low for firing.

(c) Less material is required because pipe of equal or greater crushing strength can be produced with thinner pipe walls.

(d) A shorter firing cycle is required because the walls of the pipe do not have the laminar structure characteristic of extruded pipe.

(e) Superior dimensional accuracy is achieved because there is no deformation before firing and shrinkage is lower than in extruded pipe.

(f) A smoother internal pipe surface is obtained.

These and other objects of the present invention are achieved by a method in which clay particles which have been ground to a suitable particle size and containing only five to ten percent of moisture by weight are fed into the upper end of a novel compression chamber formed in the annular space between a central mandrel and an encircling elastomeric sleeve. The pressure in the annular space is reduced to less than 5 p.s.i. absolute. The clay particles are compacted by contracting the elastomeric sleeve by means of external hydrostatic pressure. The compression chamber is not completely filled by the clay particles but on the contrary a void is left at the upper end of the annular space. Therefore, upon relaxation of the hydrostatic pressure, the elastomeric sleeve expands radially away from the molded pipe, and the molded pipe expands radially away from the mandrel and expands axially into the void at the upper end of the compression chamber. Thereafter, the molded pipe is lowered axially from the compression chamber, its ends are properly trimmed, and it is transported directly to the kiln for firing. The preheat and firing operations are conventional.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

FIGURE 1 is a sectional view of an embodiment of this invention which is employed in the manufacture of vitrified clay pipe;

FIGURE 2 is a view along the lines 2—2 of FIGURE 1, which shows how the clay pipe is held after it is removed from the compression chamber;

FIGURE 3 is an enlarged view in cross section of the compression chamber illustrating the position of the upper valve when it is desired to charge the compression chamber with clay;

FIGURE 4 is an enlarged cross-sectional view of the compression chamber showing the position of the upper valve when the compression chamber is filled with clay; FIGURE 5a is an extension of the upper end of FIGURE 5b.

Figure 5A:
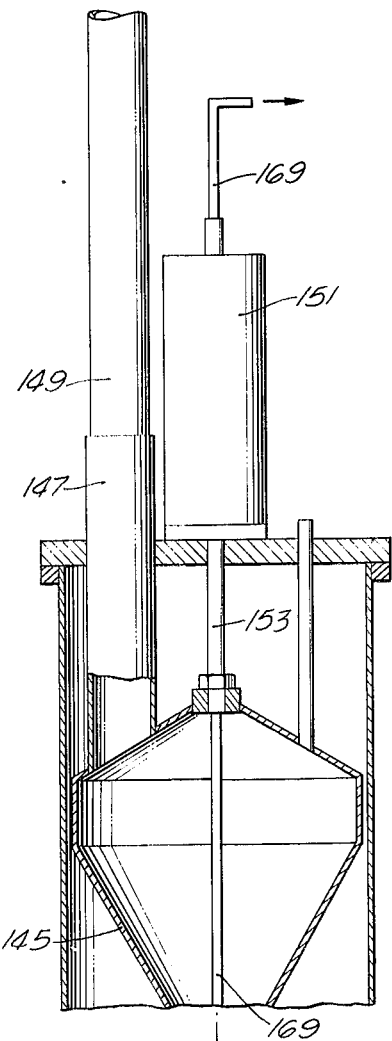
FIGURES 5a and 5b show a second form of apparatus for carrying out this invention.

Reference is made to FIGURE 1, which is a cross-sectional view of one form of apparatus which makes possible the improvement in the method of manufacture of clay pipe. The clay, after being ground to a suitable particle size, does not have water added thereto, as in the presently known practice. Referring to FIGURE 1, the amount of clay required for charging the compression cylinder in accordance with this invention is weighed in a scale 10. Upon the scale indicating the required weight of clay for charging the compression chamber, a hopper-control valve 12 is actuated to permit the clay to fall from the scale and to be directed to the compression chamber through four feed lines, two of which, respectively 14A, 14B, are shown. The passages between the feed lines and the compression chamber are blocked by a feed valve 16.

In the cross-sectional view in FIGURE 4, the enlarged view of the feed valve 16 is shown in position to block the passage of any clay from the feed line into the compression chamber. In the enlarged cross-sectional view of FIGURE 3, the feed valve is shown in the open position, wherein clay may fall from the feed line 14A, 14B into the compression chamber 18. The feed valve 16 is actuated by a hydraulic actuator 15 which moves a rod 17 attached to the valve 16.

The compression chamber is defined as the space which is established between a mandrel 20 and an elastomeric cylinder or sleeve 22, which surrounds the mandrel. The charge of clay falls into the compression chamber. At this time, the bottom of the compression chamber is closed. During the process of charging the compression chamber, vibrators 24, which are attached to the structure 26 which supports the compression chamber, are actuated in order to insure that the clay particles are properly packed in the compression chamber, and vacuum pump valve 27 is opened to reduce the absolute pressure in the compression chamber. However, the compression chamber is not completely filled, and an unfilled space or void 18a is provided at the upper end of the chamber 18.

The feed valve 16 is then closed and, in the process of closing the clay feed lines, it also slides into place an elastomeric ring 28, which closes the upper end of the compression chamber. The hydrostatic pressure is applied between the inside surface of a metal or solid cylinder 30, which surrounds the elastomeric sleeve 22. Pressure fluid is received from a pump 32, which applies the fluid to the space between the cylinder by means of an inlet pipe 34, mounted in the wall of the solid cylinder 30, and an outlet pipe 36, also mounted in the wall of the solid cylinder 30. Control of the application and/or release of pressure is permitted by means of control valves 38A, 38B, which are in the pipes connecting the pump 32 to the compression region and are controlled in a well-known manner.

From the enlarged cross-sectional views in FIGURES 3 and 4, it may be seen that the bottom of the compression chamber is closed by structure which can give the end of the clay pipe a bell shape. It may be seen that the bottom portion of the elastomeric cylinder or sleeve 22 flares outward in a region 40, whereby the inner and outer diameters of the clay pipe at this region are somewhat enlarged. An end member 42, which is circular, surrounds the mandrel 20 and extends into the bell-shaped region 40 for the purpose of enlarging the diameter of the mandrel 20 in this region. It will be readily seen that the end member 42, together with the reduced-thickness portion of the elastomeric cylinder cooperate to provide the bell at the end of the clay pipe. The bottom of the compression chamber 18 is sealed by an elastomeric ring 44, which is supported on the end member 42.

In order to properly compress the clay to provide a usable clay pipe, it is necessary that the elastomeric cylinder which is employed have sufficient rigidity so that, during the first stage of compression, the variations in density of the clay around the mandrel are ironed out. The wall should also be greater in actual thickness than the thickness of the clay to be processed. If a thin or soft diaphragm is used, the outer surface of the clay pipe which is produced will be wavy, and the wall thickness of the pipe will vary in consequence. In other words, the thickness and rigidity of the elastomeric sleeve should be such that it can compress the pipe to have a uniform thickness and a smooth, outer surface, rather than that the clay should be able to deform the elastomeric sleeve under the influence of hydrostatic pressure. A pressure is applied from the pump 32 to the space between the rigid and elastomeric cylinders sufficient to compress the clay with which the compression chamber has been loaded to a desired pipe thickness. Pressures may be employed on the order of 5000 pounds per square inch, by way of example. After an interval long enough to form the clay pipe under the applied pressure, the pressure is removed.

When pressure is removed, the elastomeric sleeve expands radially away from the molded clay pipe. The pipe exhibits a resilient phenomena; the inner diameter of the clay pipe expands away from the mandrel 20, and the clay pipe expands longitudinally into the void 18a. The bottom of the compression chamber is then lowered by means of suitable hydraulically operated elevator mechanism, and the molded pipe moves downward out of the annular space between the mandrel and the elastomeric sleeve.

As may be seen in FIGURE 1, this elevator mechanism consists of a hydraulic cylinder 46, whose fluid pressures are controlled in well-known manner from a pump 48. A piston 50 may be raised or lowered in accordance with the fluid pumped into the cylinder 46. The piston 50, as may better be seen in FIGURES 3 and 4, supports the end member 42, an extension of which is inserted into the compression chamber to assist in forming the bell end of the clay pipe. FIGURES 3 and 4 also show a hydraulically actuated locking member 52 which, when the end member 42 closes the compression chamber, is inserted into an opening through the end member to assist in holding the member 42 in the proper position and to prevent it from being pushed down under the influence of the hydrostatic pressure being applied to the elastomeric cylinder or sleeve. FIGURE 3 shows the locking member 52 in the open position, and FIGURE 4 shows the locking member 52 in the closed position.

With the locking member 52 in the open position, as shown in FIGURE 3, the piston 50 can be lowered and the pipe, which has now been formed, is withdrawn from the compression chamber. When the pipe has been completely withdrawn from the compression chamber, it is handled by apparatus well known in the art. This apparatus comprises a pair of vacuum pipe holders, respectively 56, 58, which may be seen in elevation in FIGURE 2. As may be seen in FIGURE 2, two of these pipe holders 56, 60 are rotatably supported on a common spindle 62. When the vacuum pipe holder 56 is rotated in pipe pickup position, vacuum is applied to a plurality of ports therein from a vacuum pump 68, whereby the vacuum pipe holder is able to hold the pipe 64, which is shown in FIGURE 2, and to carry the pipe thus held over to a kiln car 66. The vacuum pipe holders remove the pipe from the end member, which can then return to close up the compression chamber. The compression chamber can then be charged again with clay to begin the cycle anew.

Indexing mechanism 70 controls the motion of the vacuum pipe holders. This indexing mechanism controls the motion so that, initially, the vacuum pipe holders are swung away from off the elevator past two trimming saws, respectively 72, 74, which properly trim the ends of the pipe. The indexing mechanism then controls the motion of the vacuum pipe holders so that the pipe is rotated 180° to interchange the locations of the bell section and other end section of the pipe. The portion of the pipe which has just been cut from the end other than the bell section is then placed on the platform of the kiln car 66 underneath the location at which the pipe is lowered. The reason for placing the pipe on its cutaway portion is so that when thereafter it is moved into the heated kiln the differential expansion of the clay and the surface of the kiln car is compensated for by the intervening cut-end section.

Figure 5B:
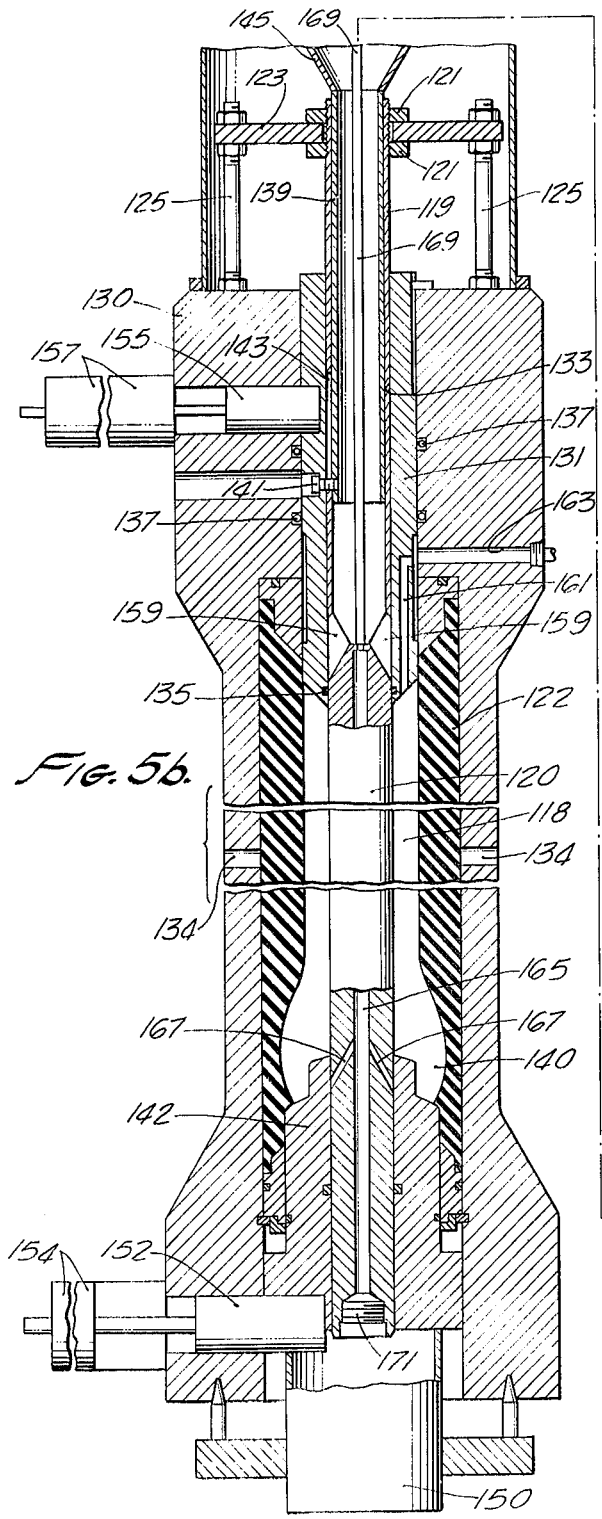

In the modified form of apparatus for carrying out this invention, as shown in FIGURES 5a and 5b, the annular compression chamber 118 is defined between the central axial mandrel 120 and the thick-walled elastomeric sleeve 122, as described above, but the mandrel 120 does not move axially. It is secured to the lower end of a support tube 119 adjustably fixed by means of the threaded nuts 121 to the platform 123. The platform 123, in turn, is supported on posts 125 resting on the stationary mold member 130. An axially movable sleeve valve 131 has a bore 133 which slidably receives the upper end of the mandrel 120 and slidably receives the mandrel support tube 119. A sealing ring 135 is provided between the sleeve valve 131 and the mandrel 120, and additional seal rings 137 are provided between the sleeve valve 131 and the stationary mold member 130.

The sleeve valve 131 is moved axially by means of pipe 139 and radial pins 141. These pins 141 extend through axial slots 143 provided in the mandrel support tube 119. The pipe 139, in turn, is fixed to the lower end of the hopper 145 which contains a measured amount of clay particles from the telescoping supply pipes 147 and 149. The hopper 145, pipe 139, and sleeve valve 131 are raised and lowered as a unit by means of the air-operated double-acting power cylinder 151 and piston rod 153.

The sleeve valve 131 is shown in closed position in the drawings. When it is desired to raise it to its open position in order to feed clay particles from the hopper 145 into the annular space 118, the latch bolt 155 is first retracted by means of the power cylinder assembly 157, and the sleeve valve 131 is then raised by means of the power cylinder assembly 151. Upward movement of the sleeve valve 131 uncovers the ports 159 near the upper end of the stationary mandrel 120 to allow clay particles to pass downward from the hopper 145 through the interior of the pipe 139 and out through the ports 159 into the annular space 118. The annular space 118 is not filled completely to the top, and instead a small void is allowed to remain near the upper end of the mandrel and below the lowermost position of the sleeve valve 131.

Introduction of clay particles into the annular space 118 may be facilitated by means of vibrators as previously described, and in addition subatmospheric pressure may be applied to the annular space 118. In addition to expediting the delivery of clay into the annular space 118, the reduction of pressure in the annular space to a value less than two pounds per square inch absolute markedly improves the strength and density of the finished pipe.

An axial passage 161 in the wall of the sleeve valve 131 communicates with the upper end of the annular space 118 and with the radial passage 163 in the stationary bolt member 130. Suction pressure may be applied through the passages 163 and 161 during the filling of the annular space 18 with clay particles. Also prior to the introduction of clay particles into the annular space 18 and prior to the elevation of the lower plug 142 to close the lower end of the space 118, suction pressure may be applied through the axial passage 165 in the mandrel which communicate with lateral ports 167 therein. Suction pressure is communicated to the mandrel passage 165 through pipe 169 which passes upward through the interior of the hopper 145 and axially through the power cylinder assembly 151.

The lower plug 154 is carried on the upper end of an elevator mechanism generally designated 150, and the lower plug 142 is locked in position by means of the plunger 152 mounted for radial movement of the lower portion of the stationary mold member 130. This locking plunger 152 is actuated by means of the hydraulic power cylinder 154. The lower end of the mandrel passage 165 is closed by a plug 171.

After the clay particles have been introduced into the annular space 118 and the enlargement 140 at the lower end thereof and after the sleeve valve 131 and lower plug 142 have been locked in position by means of their respective plungers 155 and 152, hydraulic fluid under high pressure is admitted through ports 134 in the wall of the stationary mold member 130, thereby contracting the thick-walled elastomeric sleeve 122 to compact the clay particles and form a molded clay pipe. Upon relaxation of the hydraulic pressure, the elastomeric sleeve 122 expands away from the molded pipe, and the molded pipe expands radially away from the surface of the mandrel 120 and expands longitudinally into the void at the upper end of the annular space 118. The plunger 152 is then retracted, and the elevator mechanism is actuated to lower the plug 142 and length of molded pipe downward out of the annular space 118. The molded pipe is subsequently trimmed to length and then fired, as described above.

The molded clay pipe must expand both radially and axially after the hydraulic pressure is relaxed, because the compaction step leaves the pipe with internal compression stresses. These compression stresses can only be relieved if the pipe is allowed to expand radially and to expand longitudinally.

As pointed out above, the handling of the clay pipe, once it is removed from the compression chamber, is done by apparatus well known in the art and in a manner which is well known. However, since with this invention the clay is formed into pipe which contains moisture only in the region of five to ten percent, rather than twenty percent, the drying time of the clay before it is fired at high temperature in the order of 2000° F. is reduced from a matter of days to a matter of minutes. Furthermore, during the drying of conventional pipe made in the conventional way, the pipe distorts, sometimes to a considerable extent, and shrinks approximately seven percent. Such distortion and shrinkage in drying is almost completely eliminated with the dry-forming process which is employed in accordance with this invention.

Conventional pipe shrinks between ten and twelve percent during the drying and firing processes. Clay pipe made in accordance with this invention shrinks on the order of five percent or less during firing. With lower shrinkage, it is possible to obtain greater dimensional accuracy in the finished pipe, whereby the amount of plastic material necessary for the fabrication of mechanical joints for pipes is minimized.

The previously known extrusion process produces pipe with a laminar wall structure under low compaction pressures, and therefore the crushing strength of the pipe is relatively low. Since, in accordance with this invention, there is substantially no limit on the amount of compaction to which the clay is subjected and also because the new method produces pipe with nonlaminar, homogeneous walls, crushing strength of the pipe is increased. It is possible to make a clay pipe having a much thinner, homogeneous wall, but having the same strength as clay pipe made in accordance with the presently known methods, which must have a much thicker wall. Accordingly, a substantial saving in the material required and the weight of the clay pipe is provided. This is important, since clay pipe is normally transported to the locations at which it will be used. The greater the savings in weight, the greater the savings in cost of transportation.

Accordingly, there has been described and shown herein a new and novel method of forming clay pipe which is faster and more economical than presently known methods. The process described herein makes possible a production-line type of clay pipe manufacture by practically eliminating pipe drying time, which was not possible heretofore.

Having fully described my invention, it is to be understood that I am not to be limited to the details herein set forth, but that my invention is of the full scope of the appended claims.

I claim:

1. The method of making a molded clay pipe, comprising: introducing granular clay particles into the upper end of an annular space formed between an upright elastomeric sleeve encircling a central axial mandrel, terminating the introduction of clay particles before the annular space is full to leave a void at the upper end thereof, applying hydrostatic pressure to contract the elastomeric sleeve and thereby compact the clay particles in the annular space to form a length of molded clay pipe, relaxing the hydrostatic pressure to permit the elastomeric sleeve to expand radially away from the pipe, and to permit the pipe to expand radially away from the mandrel and axially into said void, and maintaining the mandrel and the elastomeric sleeve stationary while simultaneously lowering only the pipe out of the lower end of the annular space.

2. The method of making a molded clay pipe, comprising: introducing granular clay particles into the upper end of an annular space formed between an upright elastomeric sleeve encircling a central axial mandrel, terminating the introduction of clay particles before the annular space is full to leave a void at the upper end thereof, utilizing the thickness and stiffness of the elastomeric sleeve to prevent deflection of its inner surface by said particles, applying hydrostatic pressure to contract the elastomeric sleeve and thereby compact the clay particles in the annular space to form a length of molded clay pipe, relaxing the hydrostatic pressure to permit the elastomeric sleeve to expand radially away from the pipe, and to permit the pipe to expand radially away from the mandrel and axially into said void, and maintaining the mandrel and the elastomeric sleeve stationary while simultaneously lowering only the pipe out of the lower end of the annular space.

3. The method of making a molded clay pipe with an integral bell at one end, comprising: introducing granular clay particles into the upper end of an annular space formed between an upright elastomeric sleeve encircling a central axial mandrel, the annular space having an enlargement at its lower end, terminating the introduction of clay particles before the annular space is full to leave a void at the upper end thereof, applying hydrostatic pressure to contract the elastomeric sleeve and thereby compact the clay particles in the annular space and enlargement to form a length of molded clay pipe with an integral bell at the lower end, relaxing the hydrostatic pressure to permit the elastomeric sleeve to expand radially away from the pipe, and to permit the pipe to expand radially away from the mandrel and axially into said void, and maintaining the mandrel and the elastomeric sleeve stationary while simultaneously lowering only the pipe with integral bell out of the lower end of the annular space.

4. The method of making a molded clay pipe with an integral bell at one end, comprising: introducing granular clay particles into the upper end of an annular space formed between an upright elastomeric sleeve encircling a central axial mandrel, said clay particles having a moisture content of between five and ten percent by weight, the annular space having an enlargement at its lower end, terminating the introduction of clay particles before the annular space is full to leave a void at the upper end thereof, utilizing the thickness and stiffness of the elastomeric sleeve to prevent deflection of its inner surface by said particles, applying hydrostatic pressure to contract the elastomeric sleeve and thereby compact the clay particles in the annular space and enlargement to form a length of molded clay pipe with an integral bell at the lower end, relaxing the hydrostatic pressure to permit the elastomeric sleeve to expand radially away from the pipe, and to permit the pipe to expand radially away from the mandrel and axially into said void, and maintaining the mandrel and the elastomeric sdleeve stationary while simultaneously lowering only the pipe with integral bell out of the lower end of the annular space.

References Cited by the Examiner

UNITED STATES PATENTS

| | | | |
|---|---|---|---|
| Re. 20,460 | 8/1937 | Jeffrey. | |
| 985,888 | 3/1909 | Fair | 25—30 |
| 3,000,070 | 9/1961 | Gange | 25—120 |
| 3,078,539 | 2/1963 | Duplessis | 25—120 |
| 3,126,592 | 3/1964 | Taccone. | |

OTHER REFERENCES

Glass and Ceramics, No. 6, 1955, pages 17–19 relied upon, by G. S. Bolkh, and R. M. Zayonts, et al. 264–313.

ROBERT F. WHITE, *Primary Examiner.*